(12) United States Patent
Rao

(10) Patent No.: US 10,097,659 B1
(45) Date of Patent: Oct. 9, 2018

(54) HIGH PERFORMANCE GEOGRAPHICALLY DISTRIBUTED DATA STORAGE, RETRIEVAL AND UPDATE

(71) Applicant: Amazon Technologies, Inc., Seattle, WA (US)

(72) Inventor: Siddhartha Shankara Rao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 676 days.

(21) Appl. No.: 14/572,005

(22) Filed: Dec. 16, 2014

(51) Int. Cl.
*G06F 11/14* (2006.01)
*H04L 29/08* (2006.01)

(52) U.S. Cl.
CPC ...... *H04L 67/2842* (2013.01); *G06F 11/1464* (2013.01); *H04L 67/1097* (2013.01)

(58) Field of Classification Search
CPC ............ H04L 67/2842; H04L 67/1097; G06F 11/1464

See application file for complete search history.

(56) References Cited

U.S. PATENT DOCUMENTS

| | | | | |
|---|---|---|---|---|
| 8,401,994 | B2* | 3/2013 | Hoang | G06F 17/30312 707/609 |
| 8,914,323 | B1* | 12/2014 | Allen | G06F 17/30389 707/623 |
| 8,949,180 | B1* | 2/2015 | Natanzon | G06F 17/30575 707/610 |
| 9,378,067 | B1* | 6/2016 | Agarwala | G06F 9/5088 |
| 2013/0103729 | A1* | 4/2013 | Cooney | G06F 17/30126 707/831 |
| 2013/0124483 | A1* | 5/2013 | Furuhashi | G06F 17/30315 707/661 |
| 2013/0275656 | A1* | 10/2013 | Talagala | G06F 12/0246 711/103 |
| 2014/0032691 | A1* | 1/2014 | Barton | H04L 41/00 709/206 |
| 2014/0108414 | A1* | 4/2014 | Stillerman | G06F 17/3048 707/741 |
| 2014/0365527 | A1* | 12/2014 | Fuchs | G06F 21/6227 707/786 |
| 2015/0134602 | A1* | 5/2015 | Nicholas | G06F 17/30345 707/609 |
| 2015/0249588 | A1* | 9/2015 | Leon | G06F 9/4416 709/204 |

* cited by examiner

*Primary Examiner* — Huawen A Peng
(74) *Attorney, Agent, or Firm* — Lee & Hayes, PLLC

(57) ABSTRACT

Technologies for providing high performance geographically distributed data storage, retrieval and update are disclosed herein. In particular, a key/value storage service exposes a network service application programming interface ("API") that includes create, update, retrieve, delete and configuration methods in some configurations. In order to implement the methods exposed by the API, the key/value storage service utilizes an in-memory cache service to store key/value pairs in an in-memory cache for highly performant retrieval. The key/value storage service also utilizes a distributed persistent storage service for storage of key/value pairs in a persistent backing store and for propagation of the key/value pairs to geographically distributed instances of the distributed persistent storage service.

20 Claims, 11 Drawing Sheets

HIGH PERFORMANCE GEOGRAPHICALLY DISTRIBUTED DATA STORAGE, RETRIEVAL AND UPDATE

BACKGROUND

Certain types of data needs to be available both on a wide geographic scale and in a highly performant manner. For example, certain types of data communications systems maintain subscriber profiles that include data that defines various attributes regarding how communication with subscribers is to be performed. A subscriber profile for unified communications might, for instance, contain data indicating a subscriber's current location and availability. This type of data often needs to be available across a large geographic area, such as a country, a continent or even the entire world. This data should also be available nearly instantaneously in order to support fast call completion and/or other real or near real-time communications functions. Making data available both in a wide geographic area and in a highly performant manner can, however, be very complex.

The disclosure made herein is presented with respect to these and other considerations.

DETAILED DESCRIPTION

Figure 1A:
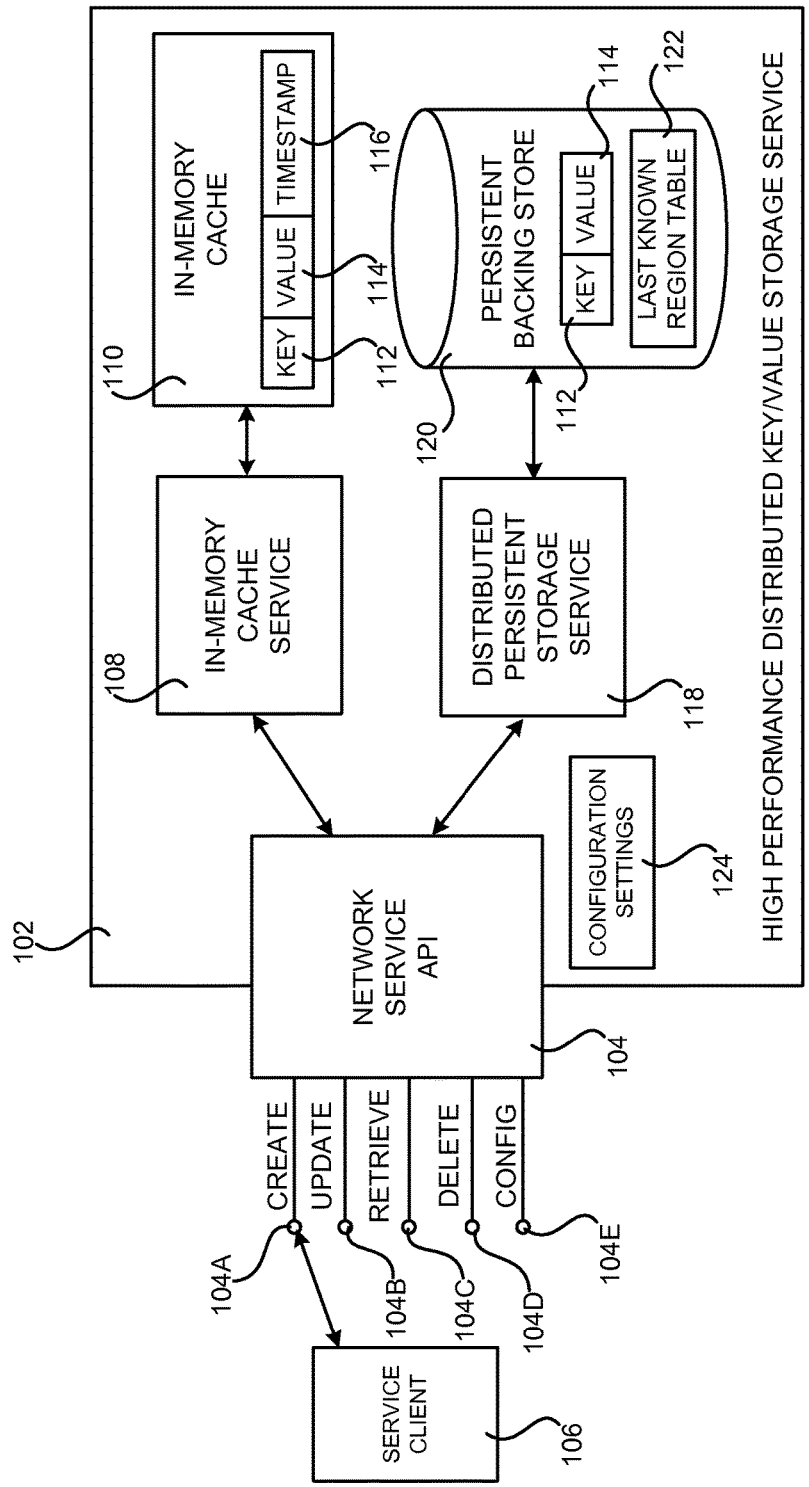
FIG. 1A is a software architecture diagram showing aspects of the configuration and operation of a high performance distributed key/value storage service disclosed herein.

The following detailed description is directed to technologies for high performance geographically distributed data storage, retrieval and update. Utilizing an implementation of the technologies described herein, data can be stored in a geographically distributed fashion and in a manner that allows highly performant retrieval of the data. For example, and without limitation, subscriber profiles for unified communication can be stored globally and retrieved in a manner that supports real or near real-time communications operations.

According to one configuration presented herein, a high performance distributed key/value storage service ("the key/value storage service") is provided that is configured to store data, such as data configured as key and value ("key/value") pairs. For example, and without limitation, the key/value storage service can be configured to store a subscriber profile for unified communications (the "value") that is associated with a subscriber username or other unique identifier (the "key"). In this regard, it should be appreciated that the technologies disclosed herein are not limited to storing subscriber profiles and can be utilized to store other types of data in other configurations. For example, and without limitation, the technologies disclosed herein can be utilized to store game state information, game subscriber information, subscriber location data for use in paging and other types of notification services, and/or other types of data in other configurations. The technologies disclosed herein also reliably guarantee consistent state, unlike some previous technologies.

In order to provide the functionality disclosed herein, the key/value storage service is configured to expose a network service application programming interface ("API"). A service client can utilize the API to configure various aspects of the operation of the key/value storage service and to perform various types of data storage and retrieval operations. For example, and without limitation, the API can include a configuration method that can be called to specify configuration settings regarding the caching of data maintained by the key/value storage service, to specify a data structure for the data stored by the key/value storage service, to specify configuration settings regarding how stored data is to be propagated among geographically distributed instances of the key/value storage service, and/or to provide other types of configuration settings and/or parameters.

The API can also include a create method for storing data, such as a new key/value pair. A call to the create method includes the data to be stored, such as the new key/value pair. In response to receiving a call to the create method, a network service call is made to an in-memory cache service to store the supplied data. The in-memory cache service is a distributed network service that is configured to maintain an in-memory (e.g. in random access memory) cache of the data (i.e. key/value pairs) stored by the key/value storage service. Because the cache is maintained in main memory, access to the stored data can be had very quickly when a request to retrieve a data is received.

When a call is made to the create method, a network service call is also made to a distributed persistent storage service in order to store the supplied data in a persistent backing store. The distributed persistent storage service is configured to store the data in a persistent backing store, such as in a database stored on rotating disk or solid-state drive devices ("SSDs"), or other types of persistent media. The distributed persistent storage service is also configured to propagate new or updated data to other instances of the distributed persistent storage service located in other geographic locations. In this way, the newly stored data can be made available to service clients over a wide geographic area rather than through a central access point. Because the internal operation of the API is hidden from the consumer, the API can be utilized in a simple manner.

The API can also include a retrieve method for retrieving data, such as for retrieving the value for a specified key. In one configuration, a call to the retrieve method specifies the key for which the requested value is to be retrieved. In response to receiving a call to the retrieve method, a query for the key is made to an instance of the in-memory cache service in the geographic region in which the retrieve request was received. If the in-memory cache service has the requested key/value pair in the in-memory cache, the key/value pair is retrieved from memory and returned in response to the API call.

If the in-memory cache service does not have the requested data (e.g. key/value pair) in memory, a query for the requested data is made to an instance of the distributed persistent storage service in the geographic region in which the request was received. If the instance of the distributed persistent storage service has the requested data, the data is obtained from the distributed persistent storage service and returned in response to the API call. Additionally, the in-memory cache is updated with the requested data. In this way, the data can be returned more quickly in response to the next call to the retrieve method for the data.

If the instance of the distributed persistent storage service in the geographic region in which the request was received does not have the requested data, the data can be obtained from another instance of the distributed persistent storage service located in another geographic region. In order to enable this functionality, a last known region table can be maintained that indicates the last known geographic region for a user associated with the data (e.g. key/value pair). The last known region table can also be maintained by the distributed persistent storage service and propagated to geographically distributed instances of the distributed persistent storage service. This table can also be hashed to reduce state management concerns.

When data such as a key/value pair is obtained from an instance of the distributed persistent storage service in another geographic location, the local in-memory cache and the local instance of the distributed persistent storage service can be updated with the retrieved data. The last known region table can also be updated to reflect the most current region from which the data was accessed.

The API can also include an update method for data, such as for updating the value for a specified key. In one configuration a call to the update method specifies the key and an updated value. In response to receiving a call to the update method, a network service call is made to the in-memory cache service to update the value for the specified key in the in-memory cache. A network service call is also made to the distributed persistent storage service to update the value associated with the key in the persistent backing store. The distributed persistent storage service then propagates the updated value to other instances of the distributed persistent storage service located in other geographic regions.

The API can also include a delete method for deleting data, such as for deleting a key/value pair. In one configuration a call to the delete method specifies the key for which the key/value pair is to be deleted. In response to receiving a call to the delete method, a network service call is made to the in-memory cache service to delete the data (e.g. key/value pair) from the in the in-memory cache. A network service call is also made to the distributed persistent storage service to delete the data from the persistent backing store. The distributed persistent storage service then propagates the deletion of the data to other instances of the distributed persistent storage service located in other geographic regions. Additional details regarding the various components and processes described briefly above for providing high performance geographically distributed data storage, retrieval and update will be presented below with regard to FIGS. 1-10.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1A is a software architecture diagram showing aspects of the configuration and operation of a key/value storage service 102 disclosed herein. FIG. 1A will be described in conjunction with FIG. 1B, which is a network diagram illustrating additional aspects of the operation of the key/value storage service 102 shown in FIG. 1A. As discussed briefly above, the key/value storage service 102 is a network service that is configured to provide functionality for the storage and retrieval of data. In some configurations, the data is configured as key/value pairs. For example, and without limitation, the key/value storage service 102 can be configured to store a subscriber profile for unified communications (the "value") that is associated with a subscriber username or other unique identifier (the "key"). In this regard, it should be appreciated that the technologies disclosed herein are not limited to storing subscriber profiles and can be utilized to store other types of key/value pairs and other types of data in other configurations. It should also be appreciated that the stored data can be simply typed or can be an object with a complex data type. Additionally, the data can include pointers (e.g. uniform resource locators) to another complex data type or profile metadata.

In order to provide the functionality disclosed herein, the key/value storage service 102 is configured to expose a network service API 104 in some configurations. An appropriately configured service client 106 can utilize the API 104 to configure various aspects of the operation of the key/value storage service 102 and related services, and to perform various types of data storage and retrieval operations. For example, and without limitation, the API 104 can include a configuration method 104E that the service client 106 can call to specify configuration settings 124 regarding the caching of data maintained by the key/value storage service 102, to specify a data structure for the data stored by the key/value storage service 102, to specify configuration settings 124 regarding how stored data is to be propagated among geographically distributed instances of the key/value storage service 102, and/or to provide other types of configuration settings 124 and/or parameters. For the avoidance of doubt, the data values can be loosely typed and configuration data can be used to determine implementation details, such as indexes and hashing strategy. Additional details regarding the operation of the configuration method 104E will be provided below with regard to FIG. 6.

In some configurations, the API also includes a create method 104A that a service client 106 can call to store data, such as a new key/value pair. A call to the create method 104A includes the new data to be stored, such as a new key/value pair that is to be stored by the key/value storage service 102. In response to receiving a call to the create method 104A, a network service call is made to a network in-memory cache service 108 to store the received data, such as a key/value pair, in an in-memory cache 108.

The in-memory cache service 108 is a distributed network service that is configured to maintain an in-memory (e.g. in random access memory ("RAM")) cache 110 of stored data. For example, when key/value pairs are stored, the in-memory cache maintains each key 112 and its associated value 114. Because the in-memory cache 110 is maintained in the RAM of a computer, or computers, access to the stored key/value pairs can be had very quickly when a request to retrieve a key/value pair is received. The in-memory cache service 108 is also configured to scale itself as the in-memory cache 110 grows in size. For example, additional instances (or "nodes") of the in-memory cache service 108 can be added as the size of the in-memory cache 110 grows.

As shown in FIG. 1A, the in-memory cache 110 can also maintain a per key 112 timestamp 116. The timestamp 116 defines a time period during which the associated value 114 in the in-memory cache 110 is valid. For example, the timestamp 116 can be set when a value 114 is stored in the in-memory cache 110 for the associated key 112. The value 114 can then be considered invalid after a predefined period has elapsed following the time specified in the timestamp 116. As will be described in greater detail below with regard to FIG. 6, the configuration method 104E can be utilized to specify various configuration settings 124 relating to the manner in which the in-memory cache service sets the timestamps 116, along with other aspects regarding the manner in which the in-memory cache service 108 maintains and/or evicts data from the in-memory cache 110.

One specific example of a component for implementing the in-memory cache 110 is the MEMCACHED open source distributed in-memory object caching system, originally developed by DANGA INTERACTIVE. In this regard, it should be appreciated that the various configurations disclosed herein can be implemented in conjunction with a distributed in-memory cache 110 implemented utilizing MEMCACHED. It should also be appreciated that the concepts presented herein can be implemented with other types of in-memory object caching systems from other developers.

When a service client 106 makes a call to the create method 104A, a network service call is also made to a distributed persistent storage service 118 in order to store the supplied data (e.g. a key/value pair) in a persistent backing store 120. The distributed persistent storage service 118 is a distributed network service that is configured to store the specified data in a persistent backing store 120, such as in a database stored on disk or on other types of persistent media. Instances of the in-memory cache service 108 and the distributed persistent storage service 118 are also located in these geographic locations.

The distributed persistent storage service 118 is also configured to propagate new or updated data, such as new or updated key/value pairs, to other instances of the distributed persistent storage service 118 located in other geographic locations. In this way, the newly stored data can be made available to service clients in other geographical locations rather than through a central access point. For instance, in the example shown in FIG. 1B, an instance 102A of the key/value storage service 102 is located in one geographic region (i.e. the West Coast of the United States). Another instance 102B of the key/value storage service 102 is located in another geographic region (i.e. the East Coast of the United States).

A service client 106 also located in the same geographic region as the instance 102A of the key/value service 102 can supply new or updated data to that instance 102A. In response to such a call, the instance 102A of the key/value service 102 will update the data in the in-memory cache 110 and the persistent backing store 120 in that geographic region. Additionally, the distributed persistent storage service 118 also propagates the supplied data, such as the key 112 and the value 114, to the instance 102B of the key/value service 102 located on the East Coast. The data can then be stored by instances of the in-memory cache 110 and the persistent backing store 120 that are located in the geographic region in which the instance 102B of the key/value storage service 102 operates. In this way, if the service client 106 roams into the same geographic region as the instance 102B of the key/value storage service 102, the service client 106 can request the stored data from the instance 102B rather than the instance 102A of the key/value storage service 102. Additional details regarding the create method 104A will be provided below with regard to FIG. 2.

As discussed briefly above, the API 104 can also include a retrieve method 104C for retrieving data stored by the key/value storage service 102. For example, a service client 106 can utilize the retrieve method 104C to obtain the value 114 for a specified key 112. A network service call to the retrieve method 104C specifies the key 112 for which the requested value 114 is to be retrieved. In response to receiving a call to the retrieve method 104C, a query for the value 114 for the specified key 112 is made to an instance of the in-memory cache service 108 in the geographic region in which the retrieve request was made. For example, if the service client 106 calls the retrieve method 104C exposed by the instance 102A of the key/value storage service 102 in the West Coast, the in-memory cache 110 maintained by the instance 102A on the West Coast will be searched for the requested key 112. If the in-memory cache service 108 has the requested key/value pair in the in-memory cache 110, the key/value pair is retrieved from memory and returned to the service client 106 in response to the call to the retrieve method 104C.

If the in-memory cache service 108 does not have the requested data in the in-memory cache 110, a query for the requested data is made to an instance of the distributed persistent storage service 118 in the geographic region in which the call to the retrieve method 104C was made. In the example shown in FIG. 1B, for instance, an instance of the distributed persistent storage service 118 on the West Coast will be queried for data requested by a service client 106 that is also on the West Coast. If the queried instance of the distributed persistent storage service 118 has the requested data (e.g. the requested key/value pair), the data is obtained from the distributed persistent storage service 118 and returned in response to the call to the retrieve method 104C made by the service client 106. Additionally, the in-memory cache 110 in the same geographic region is updated with the requested data. In this way, the data can be returned more quickly in response to the next call to the retrieve method 104C for the same data.

If the instance of the distributed persistent storage service 118 in the geographic region in which the call to the retrieve method 104C was received does not have the requested data, the data can be obtained from another instance of the distributed persistent storage service 118 located in another geographic region. For example, and without limitation, if a service client 106 located on the East Coast requests certain data from the instance 102B of the key/value storage service 102 located on the East Coast, but that data is not locally available (i.e. the data is not in the local instances of the in-memory cache 110 or the persistent backing store 120), the instance 102B can obtain the requested data from the instance 102A of the key/value storage service 102 located on the West Coast. In order to enable this functionality, a last known region table 122 can be maintained that indicates the last known geographic region for a user associated with the requested key/value pair.

The last known region table 122 can also be maintained by the distributed persistent storage service 118 and propagated to geographically distributed instances of the distributed persistent storage service 118. When data is obtained from an instance of the distributed persistent storage service 118 in another geographic location, the local in-memory cache 110 and the local instance of the persistent backing store 120 can be updated with the retrieved data. The last known region table 122 can also be updated to reflect the most current region from which the data was accessed.

Figure 1B:
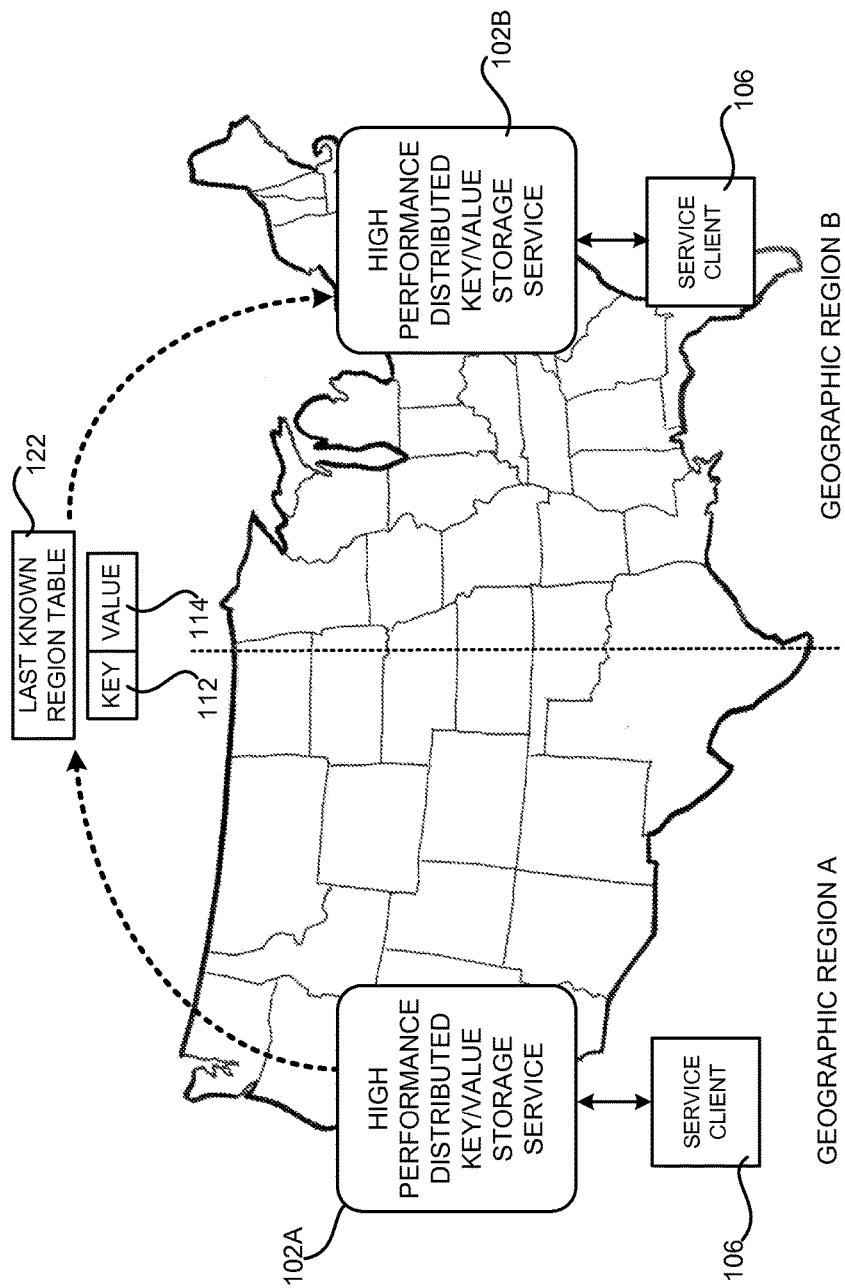
FIG. 1B is a network diagram illustrating additional aspects of the operation of the high performance distributed key/value storage service shown in FIG. 1A.

For instance, in the example shown in FIG. 1B, a service client 106 located on the East Coast can call the retrieve method 104C to obtain certain data from the instance 102B of the key/value storage service 102B located on the East Coast. If the instance 102B does not have the requested data (i.e. the data is not stored in the local instance of the in-memory cache 110 or the persistent backing store 120), the instance 102B can obtain the requested data from the instance 102A and store the data locally in the in-memory cache 110 and the persistent backing store 120. Additionally, the last known region table 122 can be updated to indicate that the geographic region including the instance 102B was the last known geographic region from which the data was accessed (i.e. the East Coast). In this way, a future request for the same data from a service client 106 on the East Coast can be fulfilled in a performant manner by the instance 102B rather than by having to first obtain the requested data from another instance, such as the instance 102A in the example shown in FIG. 1B. Additional details regarding the retrieve method 104C are provided below with regard to FIG. 3.

As also discussed briefly above, the API 104 can also include an update method 104B for updating data previously stored by the key/value storage service 102. For example, a service client 106 can call the update method 104 to update the value 114 for a specified key 112. A call to the update method 104B specifies the key 112 and an updated value 114 for the key 112. In response to receiving a call to the update method 104B, a network service call is made to the in-memory cache service 108 to update the value 114 for the specified key 112 in the in-memory cache 110. A network service call is also made to the distributed persistent storage service 118 to update the value 114 associated with the specified key 112 in the persistent backing store 120. The distributed persistent storage service 118 then propagates the updated value 114 to other instances of the distributed persistent storage service 118 located in other geographic regions. For example, in the example shown in FIG. 1B, if a value 114 is updated at the instance 102A of the key/value storage service 102 located on the West Coast, the updated value 114 can be propagated to the instance 102B of the key/value storage service 102B located on the East Coast. Additional details regarding the update method 104B are provided below with regard to FIG. 4.

The API 104 can also include a delete method 104D for deleting data, such as a key/value pair. For instance, in one configuration a call to the delete method 104D specifies the key 112 for which the key/value pair is to be deleted. In response to receiving a call to the delete method 104D, a network service call is made to the in-memory cache service 108 to delete the key/value pair from the in the in-memory cache 110. A network service call is also made to the distributed persistent storage service 118 to delete the key/value pair from the persistent backing store 120. The distributed persistent storage service 118 then propagates the deletion of the key/value pair to other instances of the distributed persistent storage service 118 located in other geographic regions. Additional details regarding the delete method 104D are provided below with regard to FIG. 5.

It should be appreciated that the implementation shown in FIGS. 1A and 1B has been simplified for discussion purposes and that many more computing, networking, and other components can be utilized than shown. For example, and without limitation, data communications networks can be utilized to connect the service client to the key/value storage service 102 and to connect the key/value storage service 102 with the in-memory cache service 108 and the distributed persistent storage service 118. Additionally, various wide area networks can be utilized to interconnect instances of the services described herein that are located in different geographic areas. Moreover, it should also be appreciated that the implementation shown in FIGS. 1A and 1B is merely illustrative, and that the various improvements disclosed herein can be utilized in many different environments and configurations. For example, and without limitation, although the in-memory cache service 108 and the distributed persistent storage service 118 are illustrated for convenience as being within the key/value storage service 102 in FIG. 1A, these services can be implemented separately from the key/value storage service in some configurations. Additional details regarding the various components shown in FIGS. 1A and 1B will be provided below.

It should be appreciated that while the configurations described above have been primarily presented in the context of storing, updating, retrieving, and deleting a single value, the technologies disclosed herein can also be utilized to perform these operations for a set (i.e. more than one) of data values. For example, and without limitation, the create method 104A may be called to store a set of values. If all of the values in the set can be successfully stored, the call will be considered to have successfully completed. If, however, any of the values is not stored successfully, then the entire call will be considered to have failed and an appropriate error message will be returned in response to the call. Additionally, if any of the values is not stored successfully, then the entire storage transaction will be rolled back. In this way, either all of the values in a set is stored or none of the values. The other API methods described herein might also be configured similarly to permit other operations on sets of data values.

Figure 2:
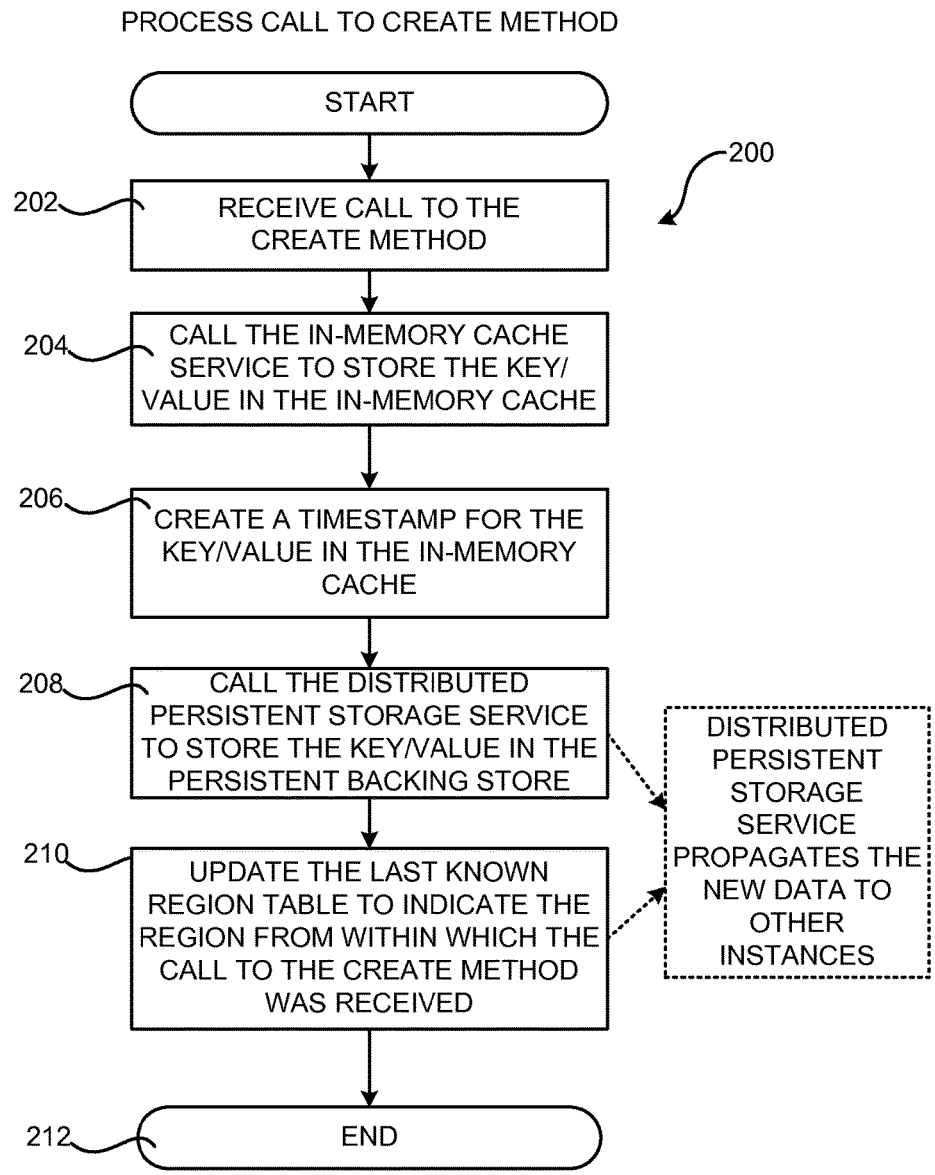
FIG. 2 is a flow diagram illustrating aspects of the operation of a create method exposed by the high performance distributed key/value storage service shown in FIGS. 1A and 1B.

FIG. 2 is a flow diagram showing a routine 200 that illustrates aspects of the operation of the create method 104A exposed by the key/value storage service 102 shown in FIGS. 1A and 1B and described above. It should be appreciated that the logical operations described herein with respect to FIG. 2, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 200 begins at operation 202, where the key/value storage service 102 receives a call to the create method 104A. In response to receiving such a call, the routine 200 proceeds to operation 204, where the key/value storage service 102 calls the in-memory cache service 108 to store the received data (e.g. the supplied key/value pair) in the in-memory cache 110. The routine 200 then proceeds to operation 206, where a timestamp 116 is created in the in-memory cache 110 for the stored data. As discussed above, the timestamp 116 can be utilized to determine whether the data in the in-memory cache 110 is valid or not.

From operation 206, the routine 200 proceeds to operation 208, where the key/value storage service 102 calls the distributed persistent storage service 118 to store the received data in the persistent backing store 120. As discussed above, the distributed persistent storage service 118 can then propagate the new data to other instances of the distributed persistent storage service 118 in other geographic locations.

From operation 208, the routine 200 then proceeds to operation 210, where the last known region table 122 is updated to identify the geographic region in which the new data was just created. The last known region table 122 can also then be propagated to other instances of the distributed persistent storage service 118 in other geographic locations. The routine 200 then proceeds from operation 210 to operation 212, where it ends.

Figure 3:
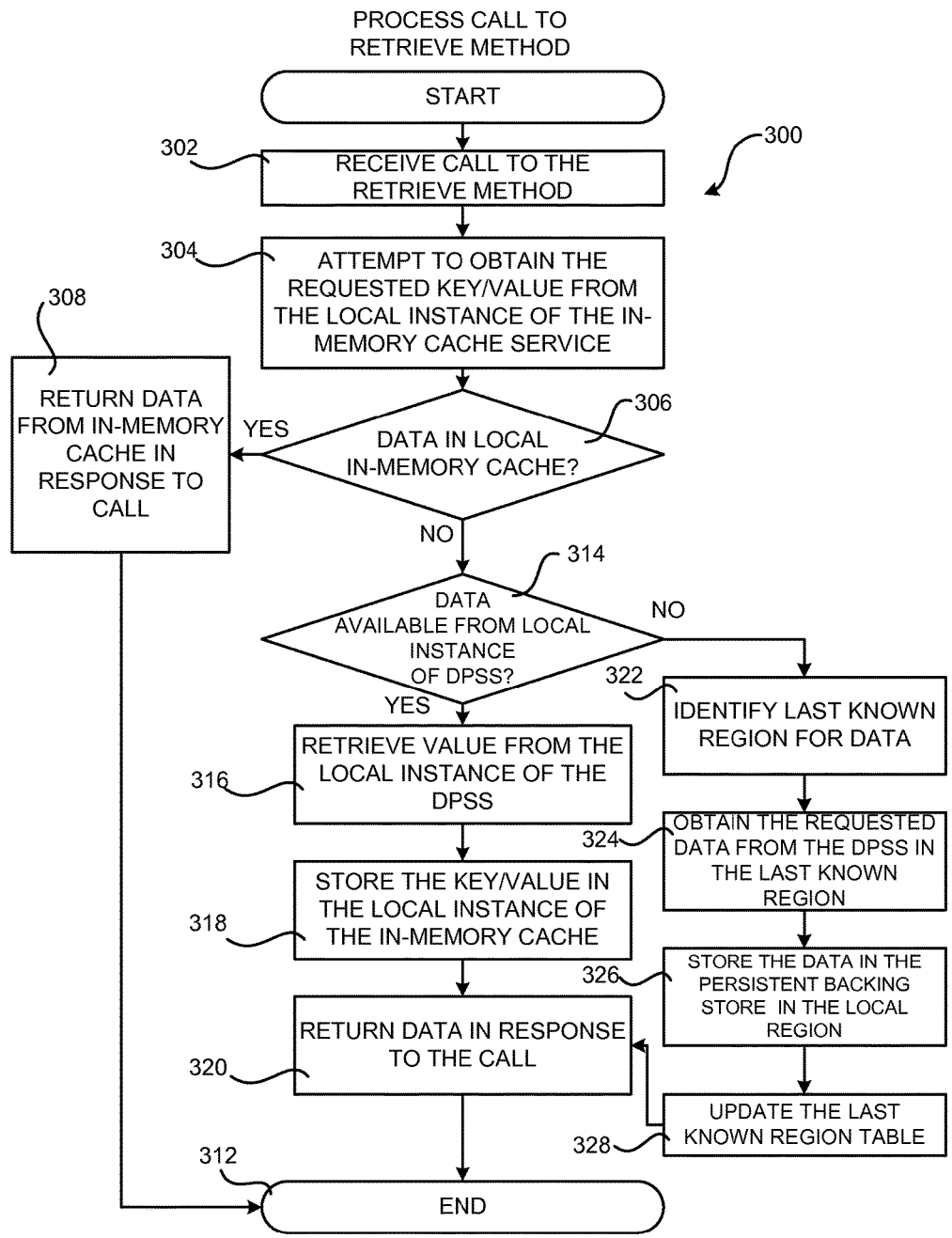
FIG. 3 is a flow diagram illustrating aspects of the operation of a retrieve method exposed by the high performance distributed key/value storage service shown in FIGS. 1A and 1B.

FIG. 3 is a flow diagram showing a routine 300 that illustrates aspects of the operation of the retrieve method 104C exposed by the key/value storage service 102. The routine 300 begins at operation 302, where the key/value storage service 102 receives a call to the retrieve method 104C. In response to such a call, the routine 300 proceeds to operation 304, where the key/value storage service 102 attempts to obtain the requested data (e.g. key/value pair) from the geographically local instance of the in-memory cache service 108 (i.e. the instance of the in-memory cache service 108 that is located in the same geographic region as the instances of the key/value storage service 102 at which the retrieval request was received).

If the geographically local in-memory cache 110 has the requested data stored therein, the routine 300 proceeds from operation 306 to operation 308. At operation 308, the requested data is retrieved from the geographically local in-memory cache 110 and returned in response to the call to the retrieve API 104C. The routine 300 then proceeds from operation 308 to operation 312, where it ends.

If the geographically local in-memory cache 110 does not contain the requested data, the routine 300 proceeds from operation 306 to operation 314. At operation 314, a determination is made as to whether the data is stored in the geographically local persistent backing store 120. If the requested data is available in the local persistent backing store 120, the routine 300 proceeds from operation 314 to operation 316.

At operation 316, the requested data (e.g. key/value pair) is retrieved from the local persistent backing store 120. A call is then made to the in-memory cache service 108 to store the requested data in the in-memory cache 110 at operation 318. In this way, the requested data will be available via the in-memory cache 110 when the next call for the same data is received. At operation 320, the requested data is then returned in response to the call to the retrieve method 104B. The routine 300 then proceeds from operation 320 to operation 312, where it ends.

If, at operation 314, a determination is made that the requested data is not available from the local instance of the persistent backing store 120, the routine 300 proceeds to operation 322. At operation 322, the distributed persistent storage service 118 identifies the location of the data using the last known region table 122. The data is then requested and received from the instance of the distributed persistent storage service 118 that has the data at operation 324. The data is then stored in the local instance of the persistent backing store 120 at operation 326. Additionally, the last known region table 122 can be updated at operation 328 to indicate the geographic region from which the call to the retrieve method 104C was made as the last known region for the requested data. The routine 300 then proceeds to operation 320, where the requested data is returned in response to the call to the retrieve method 104C.

Figure 4:
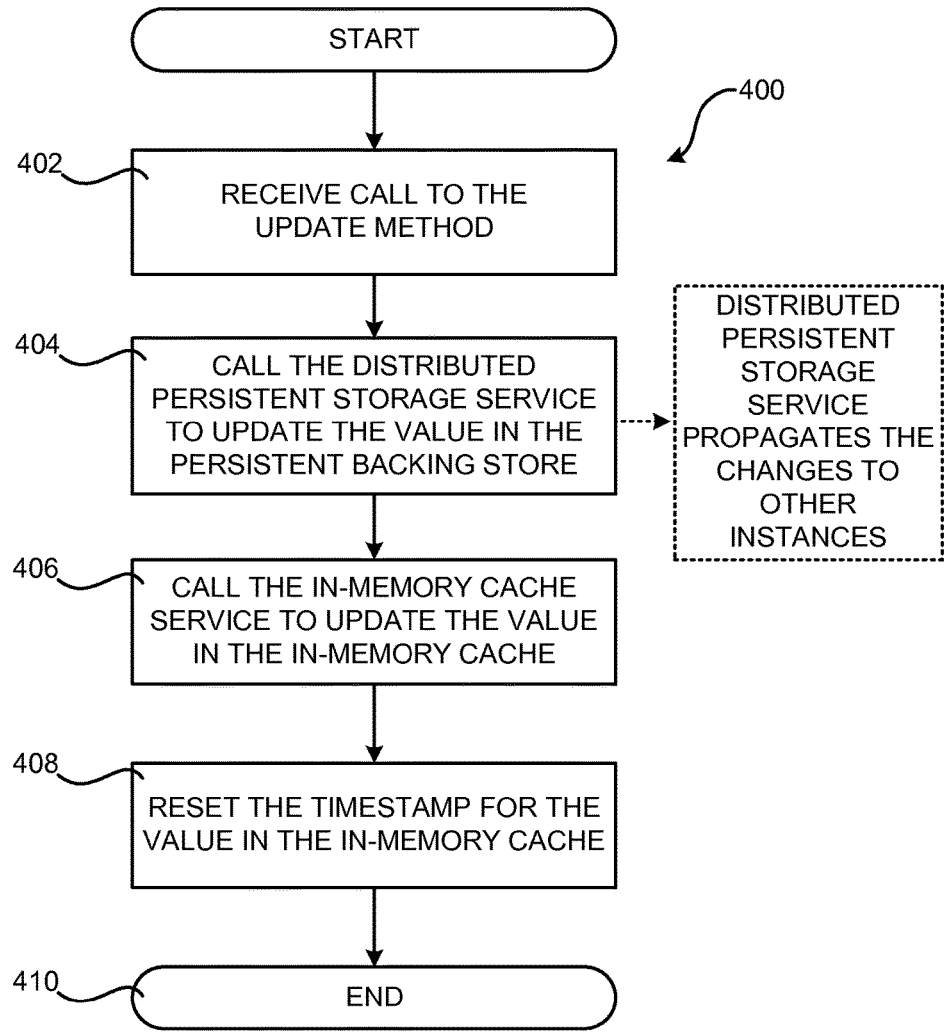
FIG. 4 is a flow diagram illustrating aspects of the operation of an update method exposed by the high performance distributed key/value storage service shown in FIGS. 1A and 1B.

FIG. 4 is a flow diagram showing a routine 400 that illustrates aspects of the operation of the update method 104B exposed by the key/value storage service 102. The routine 400 begins at operation 402, where the key/value storage service 102 receives a call to the update method 104B. As discussed above, a call to the update method 104B includes updated data to be stored, such as an updated value for a specified key. In response to such a call, the routine 400 proceeds to operation 404, where the key/value storage service 102 calls the distributed persistent storage service 118 to store the updated value 114 in the persistent backing store 120. The distributed persistent storage service 118 can then propagate the updated value 114 to other instances of the distributed persistent storage service 118 located in other geographic regions.

From operation 404, the routine 400 proceeds to operation 406, where the key/value storage service 102 calls the in-memory cache service 108 to update the value 114 in the in-memory cache 110. In response to such a call, the in-memory cache service 108 will update the value 114 in the in-memory cache 110. The in-memory cache service 108 will also update the associated timestamp 116 at operation 408. From operation 408, the routine 400 proceeds to operation 410, where it ends.

Figure 5:
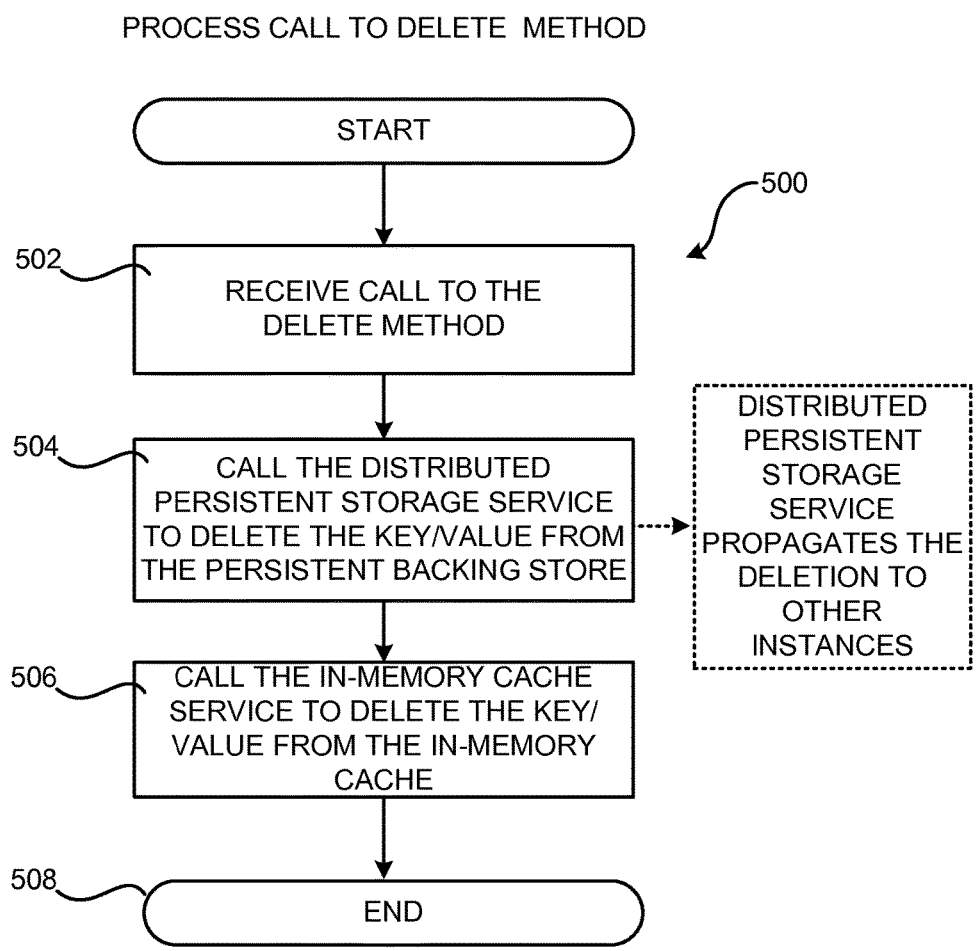
FIG. 5 is a flow diagram illustrating aspects of the operation of a delete method exposed by the high performance distributed key/value storage service shown in FIGS. 1A and 1B.

FIG. 5 is a flow diagram showing a routine 500 that illustrates aspects of the operation of the delete method 104D exposed by the key/value storage service 102. The routine 500 begins at operation 502, where the key/value storage service 102 receives a call to the delete method 104D. As discussed above, a call to the delete method 104D identifies the data to be deleted. For example, such a call can include a key 112 corresponding to the key/value pair to be deleted in one configuration. In response to such a call, the routine 500 proceeds to operation 504, where the key/value storage service 102 calls the distributed persistent storage service 118 to delete the identified data (e.g. key/value pair) from the persistent backing store 120. The distributed persistent storage service 118 can then propagate the deletion to other instances of the distributed persistent storage service 118 located in other geographic regions.

From operation 504, the routine 500 proceeds to operation 506, where the key/value storage service 102 calls the in-memory cache service 108 to delete the specified data (e.g. key/value pair) from the in-memory cache 110. In response to such a call, the in-memory cache service 108 deletes the data from in the in-memory cache 110. From operation 506, the routine 500 proceeds to operation 508, where it ends.

Figure 6:
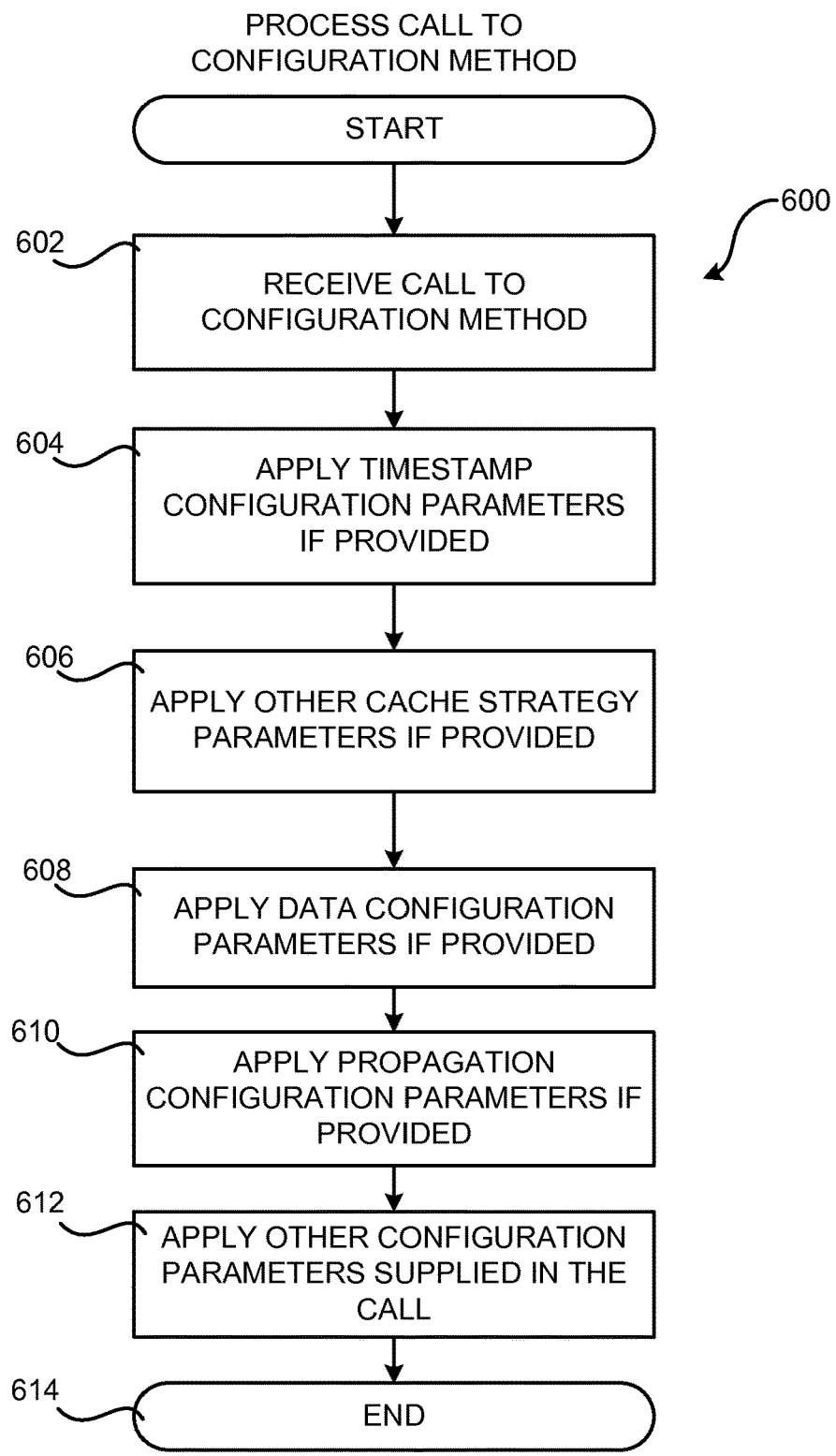
FIG. 6 is a flow diagram illustrating aspects of the operation of a configuration method exposed by the high performance distributed key/value storage service shown in FIGS. 1A and 1B.

FIG. 6 is a flow diagram showing a routine 600 that illustrates aspects of the operation of the configuration method 104E exposed by the key/value storage service 102. The routine 600 begins at operation 602, where a call to the configuration method 104E is received. As discussed briefly above, a call to the configuration method 104E can include configuration settings relating to the operation of the key/value storage service 102, the in-memory cache service 108, and/or the distributed persistent storage service 118. Some of these configuration settings 124 are described below.

From operation 602, the routine 600 proceeds to operation 604, where any timestamp configuration parameters supplied in the call to the configuration method 104E are applied to the operation of the in-memory cache service 108. The timestamp configuration parameters can be utilized to configure the manner in which the in-memory cache service 108 utilizes timestamps 116 to expire data stored in the in-memory cache 110. For example, and without limitation, the timestamp configuration parameters can specify a default period of time (e.g. one hour) within which data stored in the in-memory cache 110 is considered value. Other cache strategy configuration parameters for configuring the operation of the in-memory cache 110 can also be supplied in a call to the configuration method 104E and applied to the in-memory cache service 108 at operation 606.

From operation 606, the routine 600 proceeds to operation 608, where any data configuration parameters supplied in the call to the configuration method 104E can be applied. The data configuration parameters can provide a schema for the data to be stored in the in-memory cache 110 and/or the persistent backing store 120. The data configurations can be utilized to configure various aspects of the operation of the in-memory cache service 108 and/or the distributed persistent storage service 118.

From operation 608, the routine 600 proceeds to operation 610, where any propagation configuration parameters supplied in the call to the configuration method 104E can be applied to the distributed persistent storage service 118. The propagation configuration parameters define how data is to be propagated among various geographically disparate instances of the distributed persistent storage service 118. For example, and without limitation, propagation configuration parameters can be defined that specify the particular geographic regions to which new data, updated data, or deletions are to be propagated.

From operation 610, the routine 600 proceeds to operation 612, where any other configuration settings 124 specified in the call to the configuration method 104E can be applied. The routine 600 then proceeds from operation 612 to operation 614, where it ends.

Figure 7:
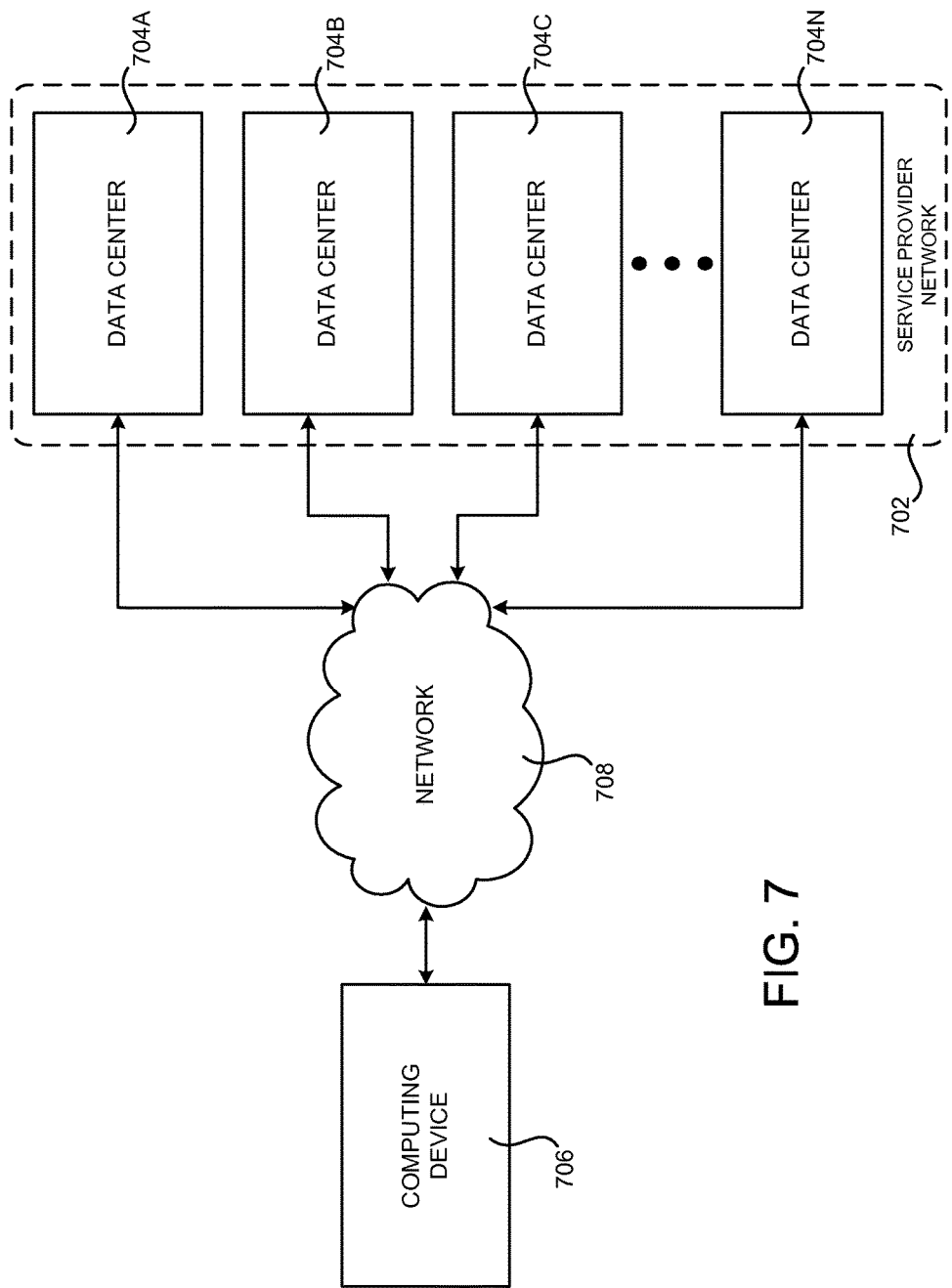
FIG. 7 is a system and network diagram that shows an illustrative operating environment that includes a service provider network that can be configured to implement aspects of the functionality described herein.

FIG. 7 is a system and network diagram that shows one illustrative operating environment for the configurations disclosed herein that includes a service provider network 702 that can be configured to provide the high performance distributed key/value storage service 102 in the manner described above, according to one configuration disclosed herein.

The service provider network 702 can provide computing resources on a permanent or an as-needed basis. Among other types of functionality, the computing resources provided by the service provider network 702 can be utilized to execute the various services described above. The computing resources provided by the service provider network 702 can include various types of computing resources, such as data processing resources, data storage resources, networking resources, data communication resources, and the like. Each type of computing resource can be general-purpose or can be available in a number of specific configurations. For example, data processing resources can be available as physical computers or virtual machine instances in a number of different configurations. The virtual machine instances can be configured to execute applications, including Web servers, application servers, media servers, database servers, some or all of the services described above, and other types of programs. Data storage resources can include file storage devices, block storage devices, and the like. The service provider network 702 can also be configured to provide other types of resources and network services.

The computing resources provided by the service provider network 702 are enabled in one implementation by one or more data centers 704A-704N (which might be referred herein singularly as "a data center 704" or in the plural as "the data centers 704"). The data centers 704 are facilities utilized to house and operate computer systems and associated components. The data centers 804 typically include redundant and backup power, communications, cooling, and security systems. The data centers 704 can also be located in geographically disparate locations. One illustrative configuration for a data center 704 that implements some of the technologies disclosed herein for providing the high performance distributed key/value storage service 102 will be described below with regard to FIG. 8.

The customers and other users of the service provider network 702 can access the computing resources provided by the service provider network 702 over a network 708, such as a wide area network ("WAN") like the Internet. For example, and without limitation, a computing device 706 operated by a customer or other user of the service provider network 702 can be utilized to access the service provider network 702 by way of the network 708. It should be appreciated that a local-area network ("LAN"), the Internet, or any other networking topology known in the art that connects the data centers 874 to remote customers and other users can be utilized. It should also be appreciated that combinations of such networks can also be utilized.

Figure 8:
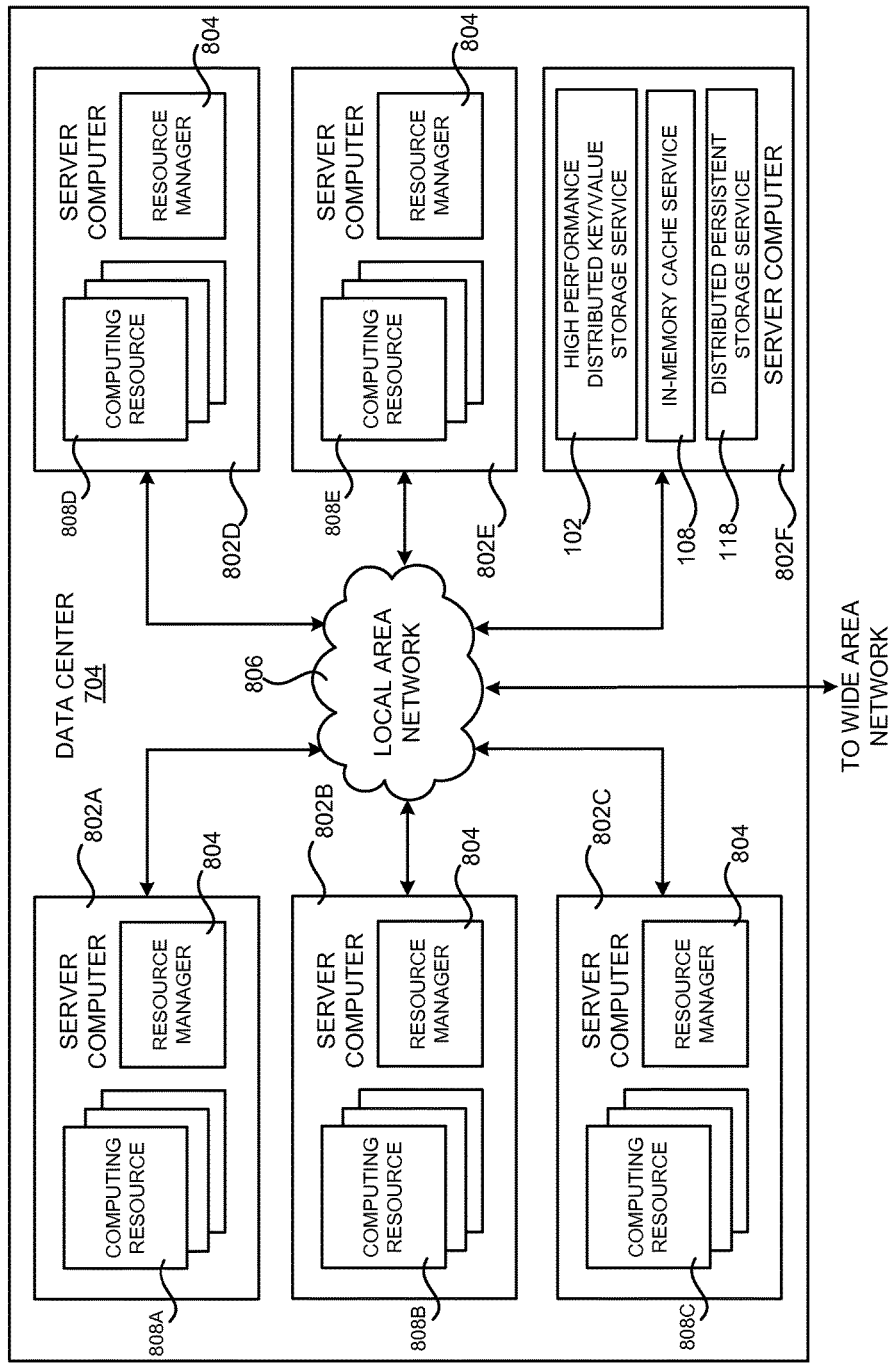
FIG. 8 is a computing system diagram that illustrates a configuration for a data center that can be utilized to implement aspects of the technologies disclosed herein.

FIG. 8 is a computing system diagram that illustrates one configuration for a data center 704 that implements aspects of the concepts and technologies disclosed herein for providing the high-performance distributed key/value storage service 102, according to one configuration disclosed herein. The example data center 704 shown in FIG. 8 includes several server computers 802A-802F (which might be referred to herein singularly as "a server computer 802" or in the plural as "the server computers 802") for providing computing resources 808A-808E.

The server computers 802 can be standard tower, rackmount, or blade server computers configured appropriately for providing the computing resources described herein. As mentioned above, the computing resources can be data processing resources such as virtual machine instances or hardware computing systems, data storage resources, database resources, networking resources, and others. Some of the servers 802 can also be configured to execute a resource manager 804 capable of instantiating and/or managing the computing resources. In the case of virtual machine instances, for example, the resource manager 804 can be a hypervisor or another type of program configured to enable the execution of multiple virtual machine instances on a single server 802. Server computers 802 in the data center 704 can also be configured to provide network services and other types of services, some of which are described in detail below with regard to FIG. 9.

The data center 704 shown in FIG. 8 also includes a server computer 802F that can execute some or all of the software components described above. For example, and without limitation, the server computer 802F can be configured to execute the high performance distributed key/value storage service 102, the in-memory cache service 108, and/or the distributed persistent storage service 118, each of which has been described in detail above. The server computer 802F can also be configured to execute other components and/or to store data for providing some or all of the functionality described herein. In this regard, it should be appreciated that the services illustrated in FIG. 8 as executing on the server computer 802F can execute on many other physical or virtual servers in the data centers 7804 in various configurations.

In the example data center 704 shown in FIG. 8, an appropriate LAN 806 is also utilized to interconnect the server computers 802A-802F. The LAN 806 is also connected to the network 708 illustrated in FIG. 7. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704N, between each of the server computers 802A-802F in each data center 704, and, potentially, between computing resources in each of the data centers 704. It should be appreciated that the configuration of the data center 704 described with reference to FIG. 8 is merely illustrative and that other implementations can be utilized.

Figure 9:
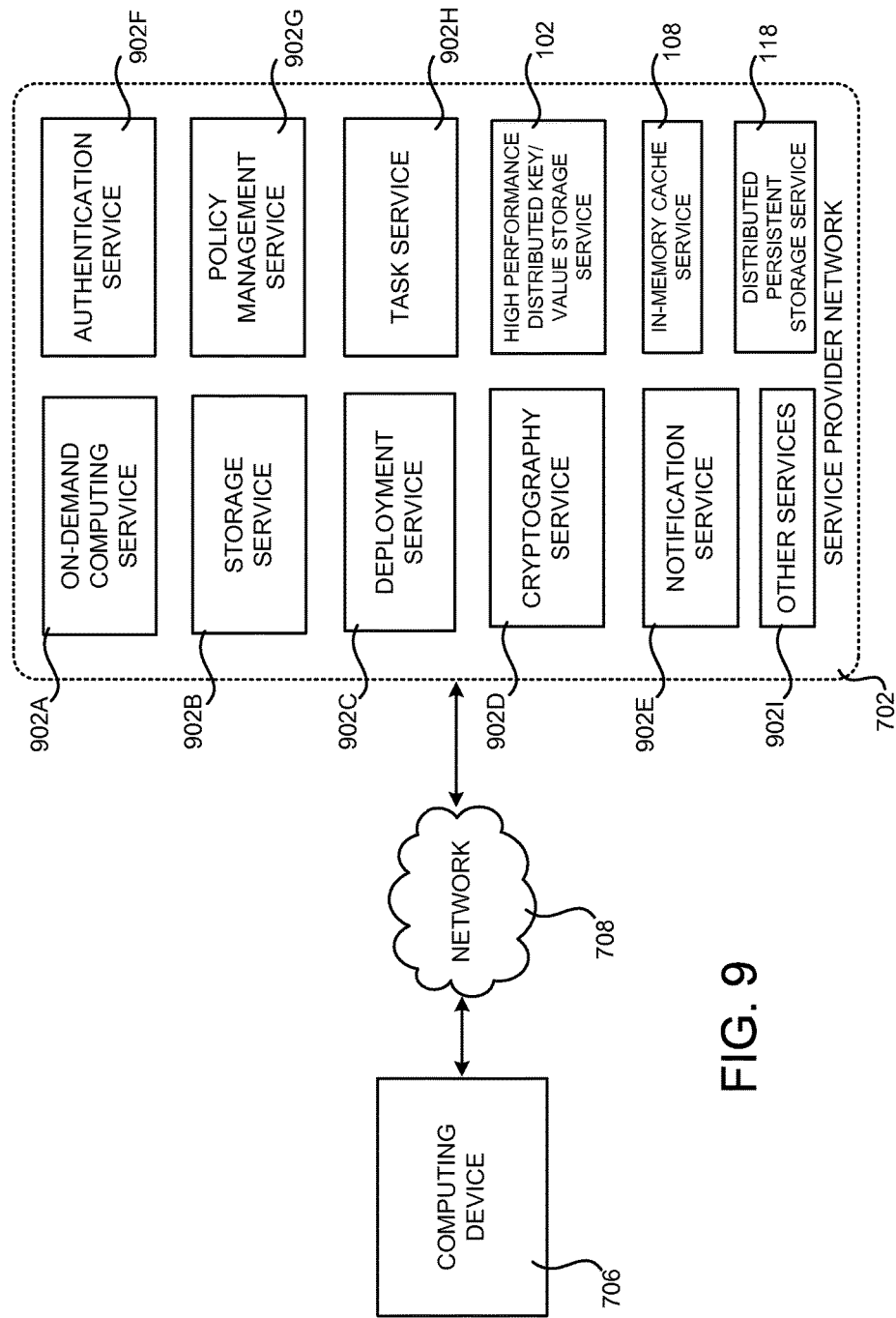
FIG. 9 is a system and network diagram that shows aspects of several services that can be provided by and utilized within a service provider network in one configuration disclosed herein.

FIG. 9 is a system and network diagram that shows aspects of several network services that can be provided by and utilized within a service provider network 702 in one configuration disclosed herein. In particular, and as discussed briefly above, the service provider network 702 can provide a variety of network services to customers and other users of the service provider network 702 including, but not limited to, an on-demand computing service 902A, a storage service 902B, a deployment service 902C, a cryptography service 902D, a notification service 902E, an authentication service 902F, a policy management service 902G, and/or a task service 902H, each of which is described in greater detail below. Additionally, the service provider network 702 can also provide the high performance distributed key/value storage service 102, the in-memory cache service 108, and/or the distributed persistent storage service 118, each of which was described in detail above. The service provider network 702 can also provide other services 9021, some of which are described in greater detail below.

It should be appreciated that customers of the service provider network 702 can include organizations or individuals that utilize some or all of the services provided by the service provider network 702. As shown in FIG. 9, a customer or other user can communicate with the service provider network 702 through a network 708, which can be a communication network, such as the Internet, an intranet or an Internet service provider ("ISP") network or a combination of such networks. Communications from the computing device 706 to the service provider network 702 can cause the services provided by the service provider network 702 to operate in accordance with the described configurations or variations thereof.

It is noted that not all configurations described include the services described with reference to FIG. 9 and that additional services can be provided in addition to or as an alternative to services explicitly described. Each of the services shown in FIG. 9 can also expose web service interfaces that enable a caller to submit appropriately configured API calls to the various services through web service requests. In addition, each of the services can include service interfaces that enable the services to access each other (e.g., to enable a virtual computer system provided by the on-demand computing service 902A to store data in or retrieve data from the data storage service 902B). Additional details regarding some of the services shown in FIG. 9 will now be provided.

The on-demand computing service 902A can be a collection of computing resources configured to instantiate virtual machine instances. For example, a customer or other user of the service provider network 702 can interact with the on-demand computing service 902A (via appropriately configured and authenticated API calls) to provision and operate virtual computer systems that are instantiated on physical computing devices hosted and operated by the service provider network 702. The virtual computer systems can be used for various purposes, such as to operate as servers supporting a website, to operate business applications or, generally, to serve as computing resources for the customer. Other applications for the virtual computer systems can be to support database applications, electronic commerce applications, business applications and/or other applications. Although the on-demand computing service 902A is shown in FIG. 9, any other computer system or computer system service can be utilized in the service provider network 702, such as a computer system or computer system service that does not employ virtualization and instead provisions computing resources on dedicated or shared computers/servers and/or other physical devices.

The storage service 902B can include software and computing resources that collectively operate to store data using block or file-level storage devices (and/or virtualizations thereof). The storage devices of the storage service 902B can, for instance, be operationally attached to virtual computer systems provided by the on-demand computing service 902A to serve as logical units (e.g., virtual drives) for the computer systems. A storage device can also enable the persistent storage of data used/generated by a corresponding virtual computer system where the virtual computer system service can only provide ephemeral data storage.

The service provider network 702 can also include a cryptography service 902D. The cryptography service 902D can utilize storage services of the service provider network 702, such as the storage service 902B, to store encryption keys in encrypted form, whereby the keys can be used to decrypt customer keys accessible only to particular devices of the cryptography service 902D. The cryptography service 902D can also provide other types of functionality not specifically mentioned herein.

The service provider network 702 can also provide a notification service 902E in some configurations. The notification service 902E can comprise a collection of computing resources collectively configured to provide a web service or other interface and a browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol ("HTTP"), e-mail and short message service ("SMS"), among others). The notification service 902E can also provide notifications to clients using a "push" mechanism without the need to periodically check or "poll" for new information and updates. The notification service 902E can further be used for various purposes such as monitoring applications executing in the on-demand computing service 902A, workflow systems, time-sensitive information updates, mobile applications, and many others.

As illustrated in FIG. 9, the service provider network 702, in various configurations, also includes an authentication service 902F and a policy management service 902G. The authentication service 902F, in one example, is a computer system (i.e., collection of computing resources) configured to perform operations involved in authentication of users. For instance, one of the services shown in FIG. 9 can provide information from a user to the authentication service 902F to receive information in return that indicates whether or not the requests submitted by the user are authentic.

The policy management service 902G, in one example, is a network service configured to manage policies on behalf of customers or internal users of the service provider network 702. The policy management service 902G can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 702, in various configurations, is also configured with a task service 902H. The task service 902H is configured to receive a task package and to enable executing tasks as dictated by the task package. The task service 902H can be configured to use any resource of the service provider network 702, such as instantiated virtual machines or virtual hosts, for executing the task. The task service 902H can configure the instantiated virtual machines or virtual hosts to operate using a selected operating system and/or a selected execution application in accordance with specified requirements.

The service provider network 702 can additionally maintain other services 902 based, at least in part, on the needs of its customers. For instance, the service provider network 702 can maintain a deployment service 902C for deploying program code and/or a database service (not shown in FIG. 9) in some configurations. A database service can be a collection of computing resources that collectively operate to create, maintain, and allow queries to be performed on databases stored within the service provider network 702. For example, a customer or other user of the service provider network 702 can operate and manage a database from the database service by utilizing appropriately configured network API calls. This, in turn, can allow the customer to maintain and potentially scale the operations in the database. Other services include object-level archival data storage services, and services that manage and/or monitor other services. The service provider network 702 can also be configured with other services not specifically mentioned herein in other configurations.

Figure 10:
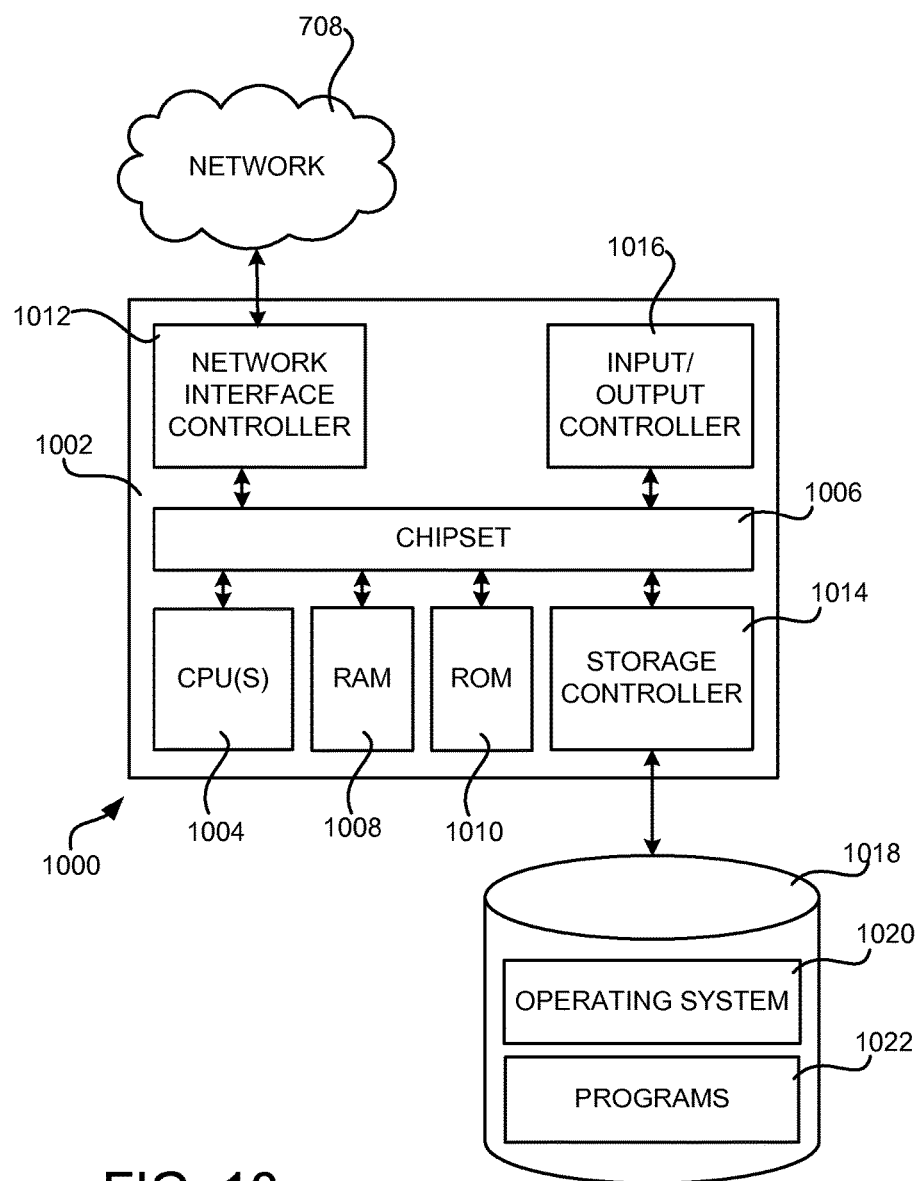
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. For example, the computer architecture shown in FIG. 10 can be utilized to execute software components for providing the various network services described above with regard to FIG. 9.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 708. The chipset 1006 can include functionality for providing network connectivity through a NIC 1012, such as a gigabit Ethernet adapter. The NIC 1012 is capable of connecting the computer 1000 to other computing devices over the network 108. It should be appreciated that multiple NICs 1012 can be present in the computer 1000, connecting the computer to other types of networks and remote computer systems.

The computer 1000 can be connected to a mass storage device 1018 that provides non-volatile storage for the computer. The mass storage device 1018 can store an operating system 1020, programs 1022, and data, which have been described in greater detail herein. The mass storage device 1018 can be connected to the computer 1000 through a storage controller 1014 connected to the chipset 1006. The mass storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1018 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1018 is characterized as primary or secondary storage, and the like.

For example, the computer 1000 can store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 can store an operating system 1020 utilized to control the operation of the computer 1000. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 1018 can store other system or application programs and data utilized by the computer 1000.

In one configuration, the mass storage device 1018 or other computer-readable storage media is encoded with computer-executable instructions which, when loaded into the computer 1000, transform the computer from a general-purpose computing system into a special-purpose computer capable of implementing the configurations described herein. These computer-executable instructions transform the computer 1000 by specifying how the CPUs 1004 transition between states, as described above. According to one configuration, the computer 1000 has access to computer-readable storage media storing computer-executable instructions which, when executed by the computer 1000, perform the various routines described above with regard to FIGS. 2-6. The computer 1000 can also include computer-readable storage media for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, a plotter, or other type of output device. It will be appreciated that the computer 1000 might not include all of the components shown in FIG. 10, can include other components that are not explicitly shown in FIG. 10, or can utilize an architecture completely different than that shown in FIG. 10.

Based on the foregoing, it should be appreciated that technologies for providing a high performance distributed key/value storage service 102 have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus for providing a key/value pair storage service, the apparatus comprising:
   a processor; and
   a non-transitory computer-readable storage medium having instructions stored thereupon which are executable by the processor and which, when executed, cause the apparatus to:
   expose a network service application programming interface (API) by way of the key/value pair storage service for storage and retrieval of a key/value pair;
   receive a first request via the API to store the key/value pair;
   make a network service call to a first instance of an in-memory cache service in a first geographic region to store the key/value pair in the first instance of the in-memory cache;
   make a network service call to a first instance of a distributed persistent storage service in the first geographic region to store the key/value pair in persistent storage;
   make a network service call to the first instance of the distributed persistent storage service to update a last known region table to associate access data with the key/value pair, wherein the access data comprises at least a reference to the first geographic region;
   propagate the key/value pair as newly stored data to at least a second instance of the distributed persistent storage service located in a second geographic region; and
   propagate the last known region table to at least the second instance of the distributed persistent storage service located in the second geographic region.

2. The apparatus of claim 1, wherein the non-transitory computer-readable storage medium has further instructions stored thereupon to:
   receive a second request via the API to retrieve the key/value pair;
   query the first instance of the in-memory cache service for the key/value pair;
   return the key/value pair in response to the second request if the first instance of the in-memory cache service has the key/value pair stored in the first instance of the in-memory cache;
   if the first instance of the in-memory cache service does not have the key/value pair stored in the first instance of the in-memory cache, query the first instance of the distributed persistent storage service in a geographic region in which the query was received for the key/value pair;
   return the key/value pair in response to the second request if the first instance of the distributed persistent storage service has the key/value pair stored in the persistent storage; and
   update the first instance of the in-memory cache with the key/value pair from the first instance of the distributed persistent storage service.

3. The apparatus of claim 2, wherein the non-transitory computer-readable storage medium has further instructions stored thereupon to:
   obtain the key/value pair from the second instance of the distributed persistent storage service located in the second geographic region if the first instance of the distributed persistent storage service does not have the key/value pair stored in the persistent storage; and
   provide the key/value pair obtained from the second instance of the distributed persistent storage service to the first instance of the distributed persistent storage service for storage in the persistent storage.

4. The apparatus of claim 1, wherein the non-transitory computer-readable storage medium has further instructions stored thereupon to:
   receive a third request via the API to update the key/value pair;
   make a network service call to the first instance of the in-memory cache service in the first geographic region to update the key/value pair in the first instance of the in-memory cache;
   make a network service call to the first instance of the distributed persistent storage service in the first geographic region to update the key/value pair in the persistent storage; and
   propagate the update to the key/value pair to at least the second instance of the distributed persistent storage service located in the second geographic region.

5. The apparatus of claim 1, wherein the non-transitory computer-readable storage medium has further instructions stored thereupon to:
   receive a fourth request via the API to delete the key/value pair;
   make a network service call to the first instance of the in-memory cache service in the first geographic region to delete the key/value pair from the first instance of the in-memory cache; and
   make a network service call to the first instance of the distributed persistent storage service in the first geographic region to delete the key/value pair from the persistent storage; and
   propagate the deletion of the key/value pair to at least the second instance of the distributed persistent storage service located in the second geographic region.

6. The apparatus of claim 1, wherein the non-transitory computer-readable storage medium has further instructions stored thereupon to:
   receive a network service call to a configuration method exposed by the API; and
   applying one or more configuration settings specified in the call to the configuration method to the first instance of the in-memory cache service and the first and second instances of the distributed persistent storage service.

7. A non-transitory computer-readable storage medium having computer-executable instructions stored thereupon which, when executed by a computer, cause the computer to:
   expose a network service application programming interface (API) comprising at least one method for storing data; and
   in response to receiving a call to the at least one method for storing the data:
   cause the data to be stored in an in-memory cache by an in-memory cache service;
   cause the data to be stored in a persistent backing store by a first instance of a distributed persistent storage service, wherein the first instance of the distributed persistent storage service is configured to propagate the data to at least one other instance of the distributed persistent storage service; and
   cause a region update to a last known region table to be stored in the persistent backing store by the first instance of the distributed persistent storage service, wherein the first instance of the distributed persistent storage service is configured to propagate the region update to at least one other instance of the distributed persistent storage service.

8. The non-transitory computer-readable storage medium of claim 7, wherein the API further comprises at least one method for retrieving the data, and wherein the non-transitory computer-readable storage medium has further computer-executable instructions stored thereupon to:
receive a call to the at least one method for retrieving the data;
return the data from the in-memory cache in response to the call if the in-memory cache stores the data;
return the data from the persistent backing store in response to the call if the in-memory cache does not store the data; and
update the in-memory cache with the data from the persistent backing store if the in-memory cache does not store the data.

9. The non-transitory computer-readable storage medium of claim 7, wherein the API further comprises at least one method for retrieving the data, and wherein the non-transitory computer-readable storage medium has further computer-executable instructions stored thereupon to:
receive a call to the at least one method for retrieving the data;
obtain the data from the at least one other instance of the distributed persistent storage service if the in-memory cache does not store the data and the first instance of the distributed persistent storage service does not store the data; and
return the data obtained from the at least one other instance of the distributed persistent storage service in response to the call.

10. The non-transitory computer-readable storage medium of claim 7, wherein the API further comprises at least one method for updating the data, and wherein the non-transitory computer-readable storage medium has further computer-executable instructions stored thereupon to:
receive a call to the at least one method for updating the data;
call the in-memory cache service to update the data in the in-memory cache in response to the call to the at least one method for updating the data; and
call the first instance of the distributed persistent storage service to update the data in the persistent backing store in response to the call to the at least one method for updating the data, whereby the first instance of the distributed persistent storage service propagates the update to the data to the at least one other instance of the distributed persistent storage service.

11. The non-transitory computer-readable storage medium of claim 7, wherein the API further comprises at least one method for deleting the data, and wherein the non-transitory computer-readable storage medium has further computer-executable instructions stored thereupon to:
receive a call to the at least one method for deleting the data;
call the in-memory cache service to delete the data from the in-memory cache in response to the call to the at least one method for deleting the data; and
call the first instance of the distributed persistent storage service to delete the data from the persistent backing store in response to the call to the at least one method for deleting the data, whereby the first instance of the distributed persistent storage service propagates the deletion of the data to the at least one other instance of the distributed persistent storage service.

12. The non-transitory computer-readable storage medium of claim 7, wherein the data comprises a key/value pair.

13. The non-transitory computer-readable storage medium of claim 7, wherein the data comprises an object with a complex data type.

14. The non-transitory computer-readable storage medium of claim 7, wherein the object comprises a pointer to another object with a complex data type.

15. A computer-implemented method for providing a distributed data storage service, the method comprising:
receiving, by way of a computer, a first request to store data; and
in response to the first request;
causing an in-memory cache service to store the data in an in-memory cache;
causing a first instance of a distributed persistent storage service to store the data in a persistent backing store, wherein the first instance of the distributed persistent storage service propagates the data to at least one other instance of the distributed persistent storage service; and
causing the first instance of the distributed persistent storage service to store a region update to a last known region table in the persistent backing store, wherein the first instance of the distributed persistent storage service propagates the region update to at least one other instance of the distributed persistent storage service.

16. The computer-implemented method of claim 15, further comprising:
receiving a second request to retrieve the data;
returning the data from the in-memory cache in response to the second request if the in-memory cache stores the data; and
returning the data from the persistent backing store in response to the second if the in-memory cache does not store the data.

17. The computer-implemented method of claim 16, further comprising:
obtaining the data from the at least one other instance of the distributed persistent storage service if the in-memory cache does not store the data and the first instance of the distributed persistent storage service does not store the data; and
returning the data obtained from the at least one other instance of the distributed persistent storage service in response to the second request.

18. The computer-implemented method of claim 15, further comprising:
receiving a third request to update the data;
causing the data to be updated in the in-memory cache in response to the third request; and
causing the data to be updated in the persistent backing store in response to the third request, whereby the first instance of the distributed persistent storage service propagates the update to the data to the at least one other instance of the distributed persistent storage service.

19. The computer-implemented method of claim 15, further comprising:
receiving a fourth request to delete the data;
causing the data to be deleted from the in-memory cache in response to the fourth request; and causing the data to be deleted from the persistent backing store in response to the fourth request, whereby the first instance of the distributed persistent storage service propagates the deletion of the data to the at least one other instance of the distributed persistent storage service.

20. The computer-implemented method of claim 15, wherein the data comprises a set of values, and wherein an error message is returned if one or more of the values cannot be stored.

* * * * *